United States Patent
Ogo

(10) Patent No.: US 6,661,997 B2
(45) Date of Patent: Dec. 9, 2003

(54) DRIVE-THROUGH SYSTEM

(75) Inventor: Shinichi Ogo, Yokohama (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 529 days.

(21) Appl. No.: 09/725,158

(22) Filed: Nov. 29, 2000

(65) Prior Publication Data

US 2001/0002467 A1 May 31, 2001

(30) Foreign Application Priority Data

Nov. 30, 1999 (JP) ............................................. 11-339160

(51) Int. Cl.⁷ .................................................. H04B 5/00
(52) U.S. Cl. .................. 455/41.1; 455/66.1; 455/552.1; 455/558; 455/563; 340/825.24; 340/825.25; 705/16
(58) Field of Search ............................... 455/41.1, 66.1, 455/552.1, 563, 558, 556.1; 340/825.24, 825.25; 705/16, 15

(56) References Cited

U.S. PATENT DOCUMENTS 5,929,848 A * 7/1999 Albukerk et al. ........... 345/700
6,253,064 B1 * 6/2001 Monroe ...................... 455/66.1
6,343,241 B1 * 1/2002 Kohut et al. ................. 700/232
6,424,820 B1 * 7/2002 Burdick et al. ............. 455/41.1

FOREIGN PATENT DOCUMENTS

JP          8110987          4/1996
JP          8111887          4/1996

* cited by examiner

Primary Examiner—Vivian Chin
Assistant Examiner—Marceau Milord
(74) Attorney, Agent, or Firm—Stevens, Davis, Miller & Mosher, LLP

(57) ABSTRACT

A car detecting unit detects entrance of an incoming car into a drive-through store. A voice processing unit processes a voice signal from a first microphone of a menu board. A base station connected to the menu board via the voice processing unit transmits/receives wirelessly the voice signal and a control signal. A head set having a second microphone and an earphone is put on a head of a store clerk for use. Order taker equipment connected to the head set transmits/receives wirelessly the voice and control signals to/from the base station. Upon detection of the incoming car by the car detecting unit, operation of the voice processing unit is automatically started to generate the control signal corresponding to a level of the voice signal in the voice processing unit. Voice level in the base station and order taker equipment is automatically adjusted according to the control signal.

9 Claims, 4 Drawing Sheets

DRIVE-THROUGH SYSTEM

BACKGROUND OF THE INVENTION

1. Field of the Invention

The present invention generally relates to a drive-through system for allowing a visitor riding in a motor vehicle or car to issue an order for an article of commerce or commodity. More particularly, the present invention is related to a drive-through system in which a wireless order data system is adopted for making it possible for a visitor riding in a car to issue an order for an article of commerce which order is wirelessly conveyed to an order taker resident in a store.

2. Description of the Related Art

At first, terminological definition is made. Phrase "drive-through system" means a system in which a visitor riding in an incoming car arrived at the site of a store can make an order for an article of commerce without need for getting off the car, which order is received by a store clerk resident in the store for delivering the article of commerce to the visitor for sale.

FIG. 4 shows a configuration of a conventional drive-through system. The drive-through system includes: a menu board 1 disposed at a parking lane for a car; a base station 4; order taker equipment 10 installed in a store; an order taker head set 16 used by a store clerk to receive an order; a magnet-type car detector 17 for detecting arrival of an incoming car at the parking lane; a sensor 18 for detecting the car with a light or ultrasonic wave beam; and a message unit 23 for informing the store clerk of entrance of a car into the site of the store based on a detection signal from the car detector 17 and/or the sensor 18

The menu board 1 is equipped with a menu-board speaker 2 and a menu-board microphone 3, wherein a list of commodities is put on the menu board 1. The base station 4 is equipped with a base station speaker amplifier 5, a base station microphone amplifier 7, a receiver 6, a transmitter 8, and a base station antenna 9. The order taker equipment 10 is equipped with an order taker antenna 15, a transmitter 11, an order taker microphone amplifier 12, a receiver 13, and an order taker power amplifier 14. The order taker head set 16 includes a microphone and an earphone.

The drive-through system further includes a voice processing unit 19 which is provided between the menu board 1 and the base station 4 and processes a voice signal inputted from the menu-board microphone 3.

Next, referring to FIG. 4, operation of the drive-through system will be described in brief.

When a car enters the parking lane, the car is detected by means of the car detector 17 and the sensor 18, whereupon a message of entrance of the car into the store site is issued to the store clerk resident within the store. A visitor riding in the car looks at the list of commodities (articles of sale) posted on the menu board 1 to order a desired article for sale in voice through the medium of the menu-board microphone 3. A voice signal from the menu-board microphone 3 is processed by the voice processing unit 19, and then is transmitted wirelessly to the order taker equipment 10 through the base station 4. The store clerk resident within the store has already known the entrance of the car into the parking lane from the message issued by the message unit 23. Accordingly, he or she can immediately respond to the order issued by the visitor through the menu-board speaker 2 with the aid of the order taker head set 16.

However, the conventional drive-through system is designed as a system in which the voice processing unit 19 is installed to control the base station 4 in accordance with the processing result thereof so that the store clerk can easily perceive the voice order of the visitor. To this end, it is required to maintain constantly alive the drive-through system, so that there is a problem that remarkable electric power is consumed.

Further, the start and stop of the processing executed by the voice processing unit 19 can manually be controlled by the store clerk using an appropriate switch. However, in the case, the store clerk has to manipulate the switch only after the recognition of entrance of the car as informed by the message issued from the message unit 23. As a result, the start of the processing executed by the voice processing unit 19 will be accompanied with not a little time lag. Besides, the switch on/off manipulation must be repeated every time an incoming car is detected, so that the burden imposed on the store clerk is aggravated. In the worst case, such situation may make a problem that the store clerk forgets to turn on/off the switch.

SUMMARY OF THE INVENTION

In the light of the state of the art described above, it is an object of the present invention to provide an improved drive-through system which is capable of starting rapidly the voice processing, mitigating the burden imposed on the store clerk, reducing the electric power consumption by processing an automatic power on/off feature and thus ensuring a high reliability as well as speediness for the operation of the drive-through system.

In view of the above and other objects which will become apparent as the description proceeds, there is provided according to a first aspect of the present invention a drive-through system which includes:

a car detecting unit for automatically messaging entrance of an incoming car into a drive-through store;

a menu board including a speaker and a microphone;

a voice processing unit for processing a voice signal generated through the microphone of the menu board;

a base station operatively connected to the menu board for transmitting/receiving wirelessly the voice signal and a control signal;

an order taker head set including a microphone and an earphone, and designed to be put on a head of a store clerk; and order taker equipment operatively connected to the order taker head set for transmitting/receiving wirelessly the voice signal and the control signal to/from the base station, wherein upon detection of an incoming car by means of the car detecting unit, operation of the voice processing unit is automatically started;

a control signal corresponding to a level of the voice signal inputted from the voice processing unit is generated; and voice levels in the base station and the order taker equipment are automatically adjusted according to the control signal.

By virtue of the arrangement of the drive-through system described above, the operation of the voice processing unit can automatically be started upon the automatic detection of the incoming car, whereby the voice processing can be started speedily. Further, the burden imposed on the store clerk can be mitigated significantly because the operation for turning on/off the voice processing unit can automatically be triggered. Additionally, the power consumption of the drive-through system can be reduced. Furthermore, owing to the capability of the automatic adjustment of the voice level, the visitor's voice level can be held to be substantially constant, whereby the store clerk can perceive or recognize clearly the voice order of the visitor without fail.

According to a second aspect of the present invention, there is provided a drive-through system which includes:

a car detecting unit for automatically messaging entrance of an incoming car into a drive-through store;

a menu board including a speaker and a microphone whose pointing direction is controllable;

an image pickup device for picking up an image of a visitor riding in the incoming car;

an image processing unit for processing an image signal outputted from the image pickup device;

a base station operatively connected to the menu board for transmitting/receiving wirelessly a voice signal and a control signal;

an order taker head set including a microphone and an earphone, and designed to be put on a head of a store clerk; and order taker equipment operatively connected to the order taker head set for transmitting/receiving wirelessly the voice signal and the control signal to/from the base station, wherein the pointing direction of the microphone is automatically adjusted so as to be oriented toward the visitor picked up by the image pickup device on the basis of the result of the processing executed by the image processing unit.

Owing to the arrangement of the drive-through system described above, the pointing direction of the menu-board microphone can automatically be controlled according to the position of the face or mouth of the visitor detected on the basis of the image signal from the camera. Thereby, the ratio of the voice signal to noise such as engine noise (i.e. S/N) can be improved, so that the disturbing influence of the ambient noise to the voice signal can effectively be suppressed. As a result, the store clerk can perceive the voice order of the visitor with enhanced accuracy and reliability.

According to a third aspect of the present invention, there is provided a drive-through system which includes:

a car detecting unit for automatically messaging entrance of an incoming car into a drive-through store;

a menu board including a speaker and a microphone whose pointing direction is controllable;

a voice processing unit for processing a voice signal generated through the microphone of the menu board;

an image pickup device for picking up an image of a visitor riding in the car;

an image processing unit for processing an image signal outputted from the image pickup device;

a base station operatively connected to the menu board for transmitting/receiving wirelessly the voice signal and a control signal;

an order taker head set including a microphone and an earphone and designed to be put on a head of a store clerk; and order taker equipment operatively connected to the order taker head set for transmitting/receiving wirelessly the voice signal and the control signal to/from the base station, wherein upon detection of an incoming car by means of the car detecting unit, operation of the voice processing unit is automatically started;

a control signal corresponding to a level of the voice signal outputted from the voice processing unit is generated to adjust automatically the level of the voice signal supplied from the menu board according to the control signal in the base station and the order taker equipment; and the pointing direction of the microphone is automatically adjusted so as to be oriented toward the visitor picked up by the image pickup device on the basis of the result of the processing executed by the image processing unit upon detection of the incoming car.

By virtue of the arrangement described above, the voice processing unit can automatically be turned on/off according to the automatic detection of the incoming car. Thereby, the voice processing can automatically be started speedily. Further, the store clerk can get rid of the burden of turning on and off the voice processing unit. Besides, the drive-through system can be operated with a reduced power consumption. Furthermore, owing to the capability of automatic adjustment of the visitor's voice level, it can be held to be substantially constant. Moreover, by controlling the pointing direction of the menu-board microphone toward the face or mouth of the visitor by making use of the video signal from the camera, the ratio of the voice signal to noise such as engine noise (i.e. S/N) can significantly be improved. As a result, the influence of the ambient noise can effectively be suppressed, so that the store clerk can perceive the visitor's voice order with enhanced accuracy and reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DETAILED DESCRIPTION OF THE EMBODIMENTS

Now, drive-through systems according to first to third embodiments of the present invention will be described in detail by reference to FIGS. 1 to 3.

(First Embodiment)

Figure 1:
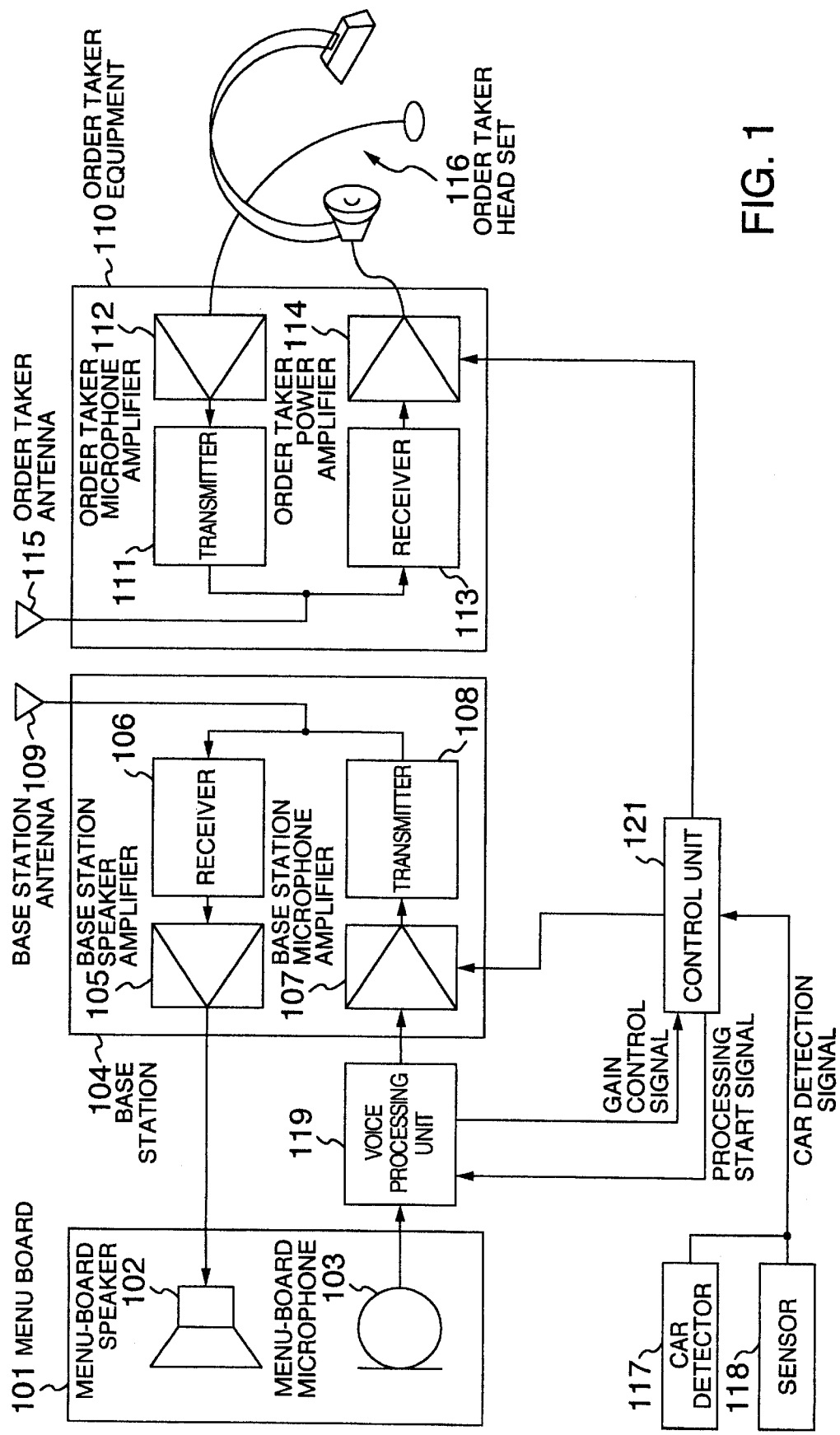
FIG. 1 is a block diagram showing generally and schematically a configuration of a drive-through system designed for controlling a voice level through a voice processing, according to a first embodiment of the present invention.

At first, description will be directed to a configuration of the drive-through system according to the first embodiment of the present invention by reference to FIG. 1. FIG. 1 is a block diagram showing generally and schematically a configuration of the drive-through system according to the first embodiment.

In this drive-through system, arrival or entrance of an incoming car at or into the site of a store is detected by means of a car detector 117 or a sensor 118. The arrival of the car is informed or messaged to a control unit 121 from the car detector 117 or the sensor 118 in the form of a car detection signal. A voice processing unit 119 then starts operation for processing a voice signal of a visitor riding in the incoming car under the control of the control unit 121. The voice processing unit 119 outputs to the control unit 121 a gain control signal corresponding to the acquired voice level of the visitor. The control unit 121 controls the voice processing performed by constituent units of the drive-through system such as a base station microphone amplifier 107 and an order taker power amplifier 114, according to the gain control signal.

In this drive-through system, a menu board 101 serves to convey to a store clerk an article of commerce or commodity selected by the visitor from a commodities list (a list of articles of commerce) as posted on the menu board 101. The menu board 101 includes a menu-board speaker 102, and a menu-board microphone 103 connected operatively to the voice processing unit 119.

A base station 104 amplifies the voice signal of the visitor received from the menu-board microphone 103 by way of the voice processing unit 119, and then transmits the amplified voice signal to order taker equipment 110. Further, the base station 104 receives a voice signal of the store clerk transmitted from the order taker equipment 110, and then outputs the received voice signal to the menu-board speaker 102. To this end, the base station 104 includes a base station speaker amplifier 105 connected to the menu-board speaker 102, a receiver 106 connected to the base station speaker amplifier 105, a base station microphone amplifier 107 connected to the voice processing unit 119, a transmitter 108 connected to the base station microphone amplifier 107, and a base station antenna 109 connected to the receiver 106 and the transmitter 108.

The order taker equipment 110 amplifies the voice signal of the store clerk inputted from a microphone of an order taker head set 116, and then transmits the amplified voice signal to the base station 104. Further, the order taker equipment 110 receives the visitor's voice signal transmitted from the base station 104, and then outputs the received voice signal to an earphone of the order taker head set 116. To this end, the order taker equipment 110 includes an order taker microphone amplifier 112 connected to the microphone of the order taker head set 116, a transmitter 111 connected to the order taker microphone amplifier 112, an order taker power amplifier 114 connected to the earphone of the order taker head set 116, a receiver 113 connected to the order taker power amplifier 114, and an order taker antenna 115 connected to the transmitter 111 and the receiver 113.

In this conjunction, it should be mentioned that the order taker head set 116 including the microphone and the earphone may also be implemented in the form of an input/output unit which includes a microphone and a speaker. Further, although the order taker equipment 110 is ordinarily put on the head of the store clerk for use, it may be implemented in the form of a table-top unit.

The control unit 121 makes the voice processing unit 119 start operation based on the car detection message from the car detector 117 or the sensor 118. The voice processing unit 119 is activated in response to a car detection message generated by the control unit 121 upon detection of the incoming car to thereby carry out the processing of the voice signal inputted from the menu-board microphone 103. The voice processing unit 119 detects the voice level of the inputted voice signal to thereby output the gain control signal corresponding to the detected voice level to the control unit 121. The control unit 121 responds to the gain control signal supplied from the voice processing unit 119 to thereby control the voice levels in the base station microphone amplifier 107 of the base station 104 and the order taker power amplifier 114 of the order taker equipment 110.

In general, a magnetic coil type detector or a switch type detector is employed as the car detector 117 in most of the practical applications. However, the present invention is never restricted to the use of such type detector. Any other types of the car detectors may be employed so far as the arrival or entrance of the incoming car at or into the site of the store can be detected and a corresponding message can be issued. Further, the sensor 118 serves to issue information for messaging the arrival or entrance of the incoming car similarly to the car detector 117. Thus, an infrared ray-type sensor, an ultrasonic type sensor, an optical type sensor or the like can be employed as the sensor 118.

Next, description will turn to operation of the drive-through system according to the first embodiment by reference to FIG. 1.

When the car enters the parking lane, the car detection signal is issued by the car detector 117 or the sensor 118 to be outputted to the control unit 121. Upon reception of the car detection signal, the control unit 121 outputs the processing start signal to the voice processing unit 119. The voice processing unit 119 starts the voice processing in response to the processing start signal. The voice processing unit 119 processes the voice signal inputted from the menu-board microphone 103, and then outputs to the control unit 121 the gain control signal corresponding to the voice level of the visitor. The control unit 121 controls the gains of the base station microphone amplifier 107 and the order taker power amplifier 114 in accordance with the received gain control signal.

In this manner, the gain of the voice signal inputted from the menu-board microphone 103 can be held at a substantially constant value. Further, the voice processing unit 119 can automatically be turned off when the car leaves the parking lane.

As will be appreciated from the foregoing description, in the drive-through system according to the first embodiment, the voice processing unit 119 can automatically be turned on and off in response to arrival and leaving of the car. Thereby, the voice processing can be started speedily with the burden imposed on the store clerk(s) being mitigated correspondingly. Besides, the drive-through system can be implemented in a structure of less power consumption. Furthermore, owing to the capability of automatic adjustment of the visitor's voice level, it can be held to be substantially constant. Thereby, the store clerk can receive the orders of the visitors without fail, so that the reliability of the drive-through system can be enhanced remarkably.

(Second Embodiment)

Figure 2:
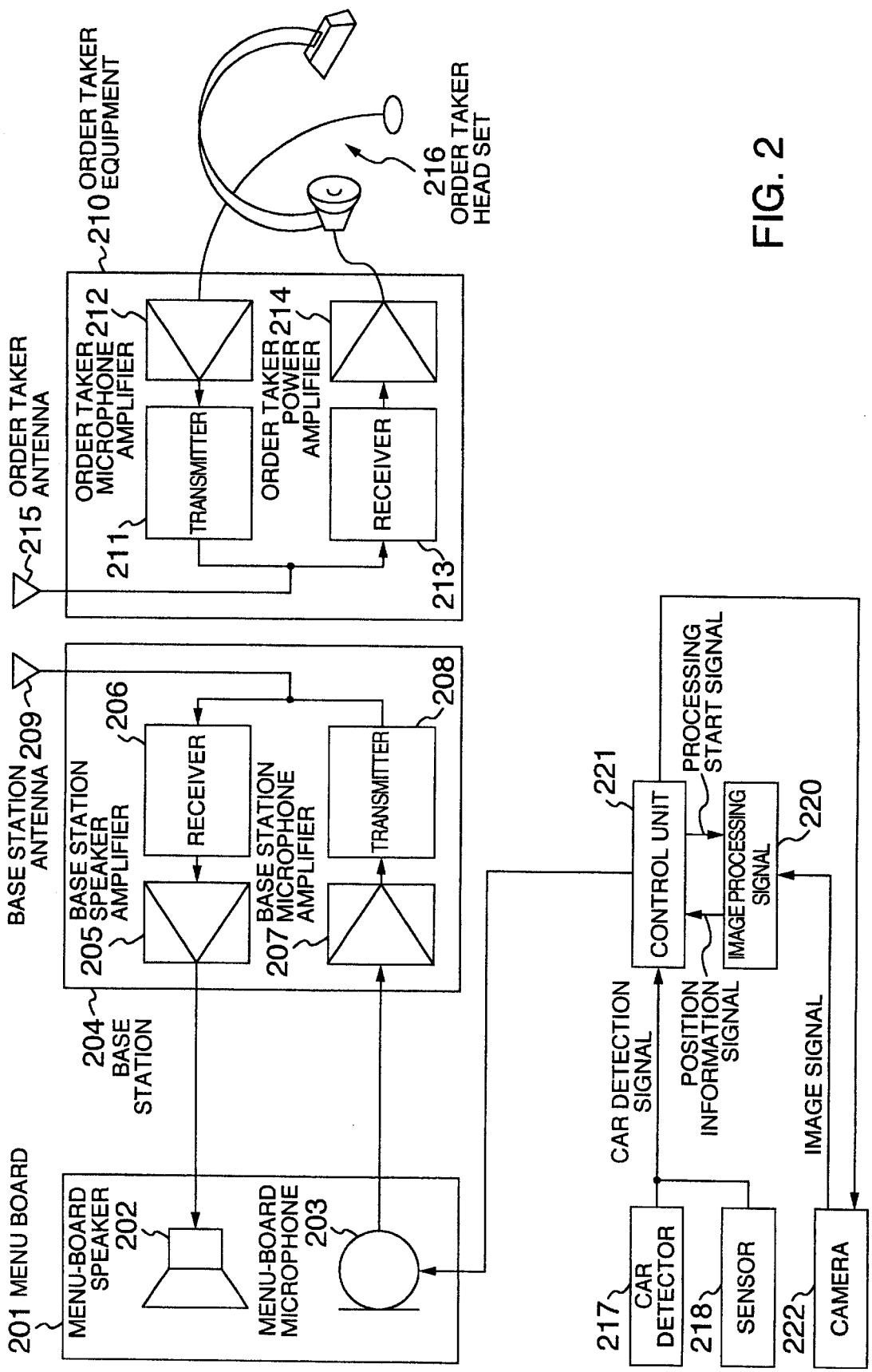
FIG. 2 is a block diagram showing generally and schematically a configuration of a drive-through system designed for controlling a pointing direction of a menu-board microphone through an image processing, according to a second embodiment of the present invention.

Next, description will be directed to a configuration of the drive-through system according to the second embodiment of the present invention by reference to FIG. 2.

The drive-through system according to the instant embodiment is so arranged as to detect a pointing direction of a menu-board microphone 203 having directivity with a camera 222 for automatic control of the pointing direction.

In more concrete, when a car detector 217 or a sensor 218 detects arrival or entrance of an incoming car, in response to an image signal from the camera 222 which is processed by an image processing unit 220, the position or posture of the menu-board microphone 203 is automatically controlled so that the pointing direction of the menu-board microphone 203 having directivity is pointed toward the face or mouth of the visitor. Thereby, the voice signal from the menu-board microphone 203 can be protected against disturbing influence of the ambient noise without using the voice processing unit 119 shown in FIG. 1.

Configurations of other blocks in the drive-through system according to the second embodiment shown in FIG. 2 are similar to those of the corresponding blocks in the drive-through system according to the first embodiment described above, so that the detailed description thereof will be omitted.

Next, description will turn to operation of the drive-through system according to the second embodiment by reference to FIG. 2.

When the car enters a parking lane provided at the site of the store, a car detection signal is issued by the car detector 217 or the sensor 218 to be outputted to a control unit 221. Upon reception of the car detection signal, the control unit 221 makes the camera 222 operate, and outputs a processing start signal to the image processing unit 220. The image processing unit 220 processes the image signal from the camera 222, and then outputs to the control unit 221 a positional information signal which indicates the position of the face, mouth or the like of the visitor. Upon reception of the positional information signal, the control unit 221 controls the position of the menu-board microphone 203 having directivity so that it is pointed toward the face or mouth of the visitor.

Operations of other blocks in the drive-through system according to the second embodiment shown in FIG. 2 are similar to those of the corresponding blocks in the drive-through system according to the first embodiment described above, so that the detailed description thereof will be omitted.

As is apparent from the above, with the drive-through system according to the second embodiment, the pointing direction of the menu-board microphone 203 is controlled according to the image signal from the camera 222 so as to orient toward the face or mouth of the visitor. Thereby, the ratio of the visitor's voice signal to noise such as engine noise (i.e. S/N) can be improved. As a result, the influence of the ambient noise to the voice signal can considerably be reduced, so that the store clerk can surely understand or perceive the voice of the visitor.

(Third Embodiment)

Referencing to FIG. 3, description will now be made of a configuration of the drive-through system according to the third embodiment of the present invention.

The drive-through system according to the instant embodiment is so arranged as to automatically turn on a voice processing unit 319 upon detection of an incoming car to thereby control automatically the voice level of a visitor, and as to detect a pointing direction of a menu-board microphone 303 having directivity by means of a camera 322 to thereby control automatically the pointing direction of the menu-board microphone 303.

In more concrete, arrival of the incoming car at a store is detected by means of a car detector 317 or a sensor 318. Upon detection of the incoming car, the voice processing unit 319 starts the processing of a visitor's voice signal under the control of a control unit 321. The control unit 321 controls the voice processing carried out by constituents of the drive-through system such as a base station microphone amplifier 307 and an order taker power amplifier 314, in accordance with the visitor's voice level acquired through the processing executed by the voice processing unit 319.

Further, upon detection of arrival of the incoming car, an image processing unit 320 starts image processing of an image signal from the camera 322 to detect the pointing direction of the menu-board microphone 303. Then, the position of the menu-board microphone 303 is controlled so that the pointing direction thereof is oriented toward the face or mouth of the visitor. Thereby, the voice picked up through the menu-board microphone 303 can positively be protected against the disturbing influence of ambient noise.

Figure 3:
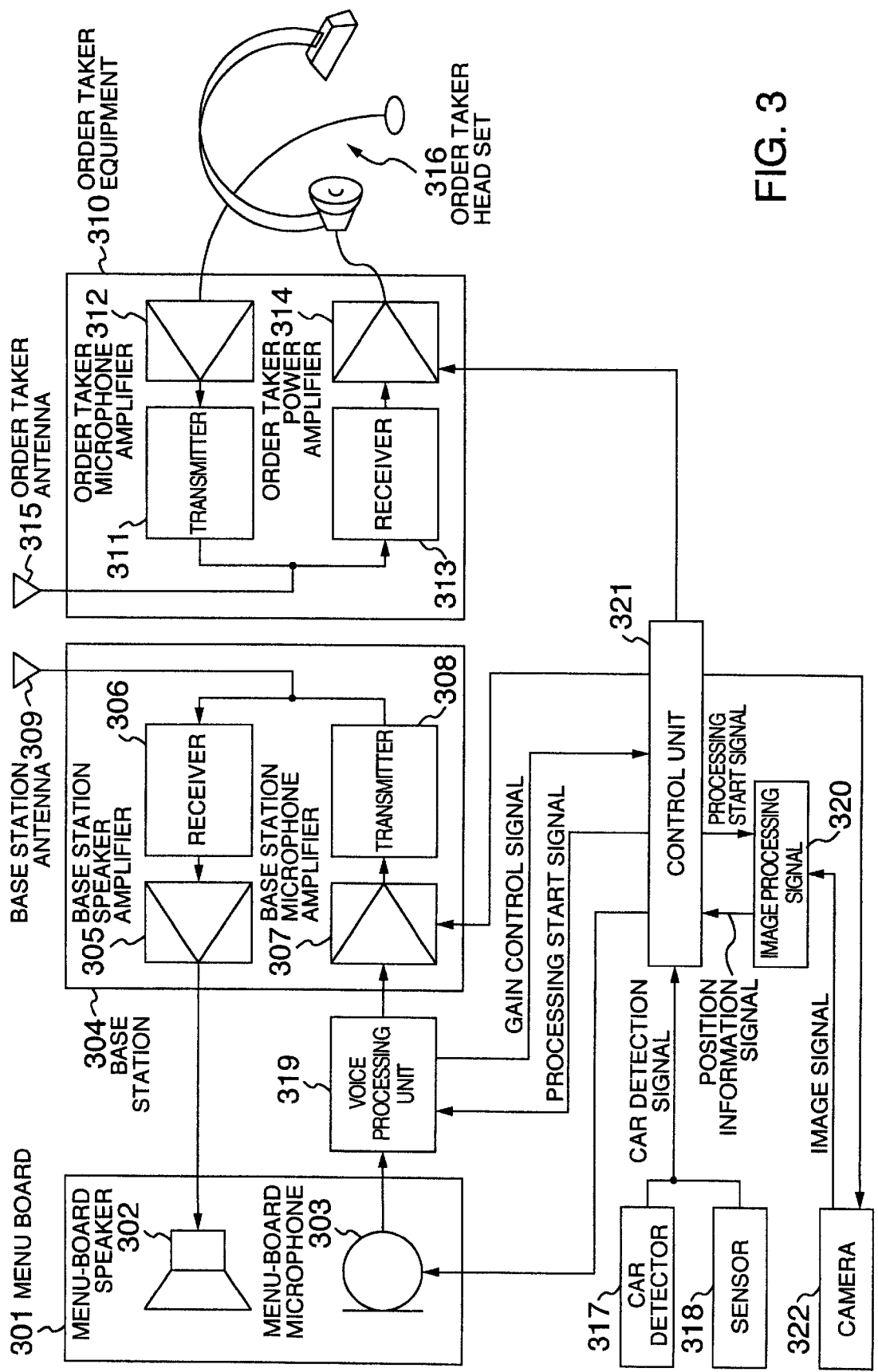
FIG. 3 is a block diagram showing generally and schematically a configuration of a drive-through system designed for controlling a voice level through a voice processing while controlling a pointing direction of a menu-board microphone through an image processing, according to a third embodiment of the present invention.
Figure 4:
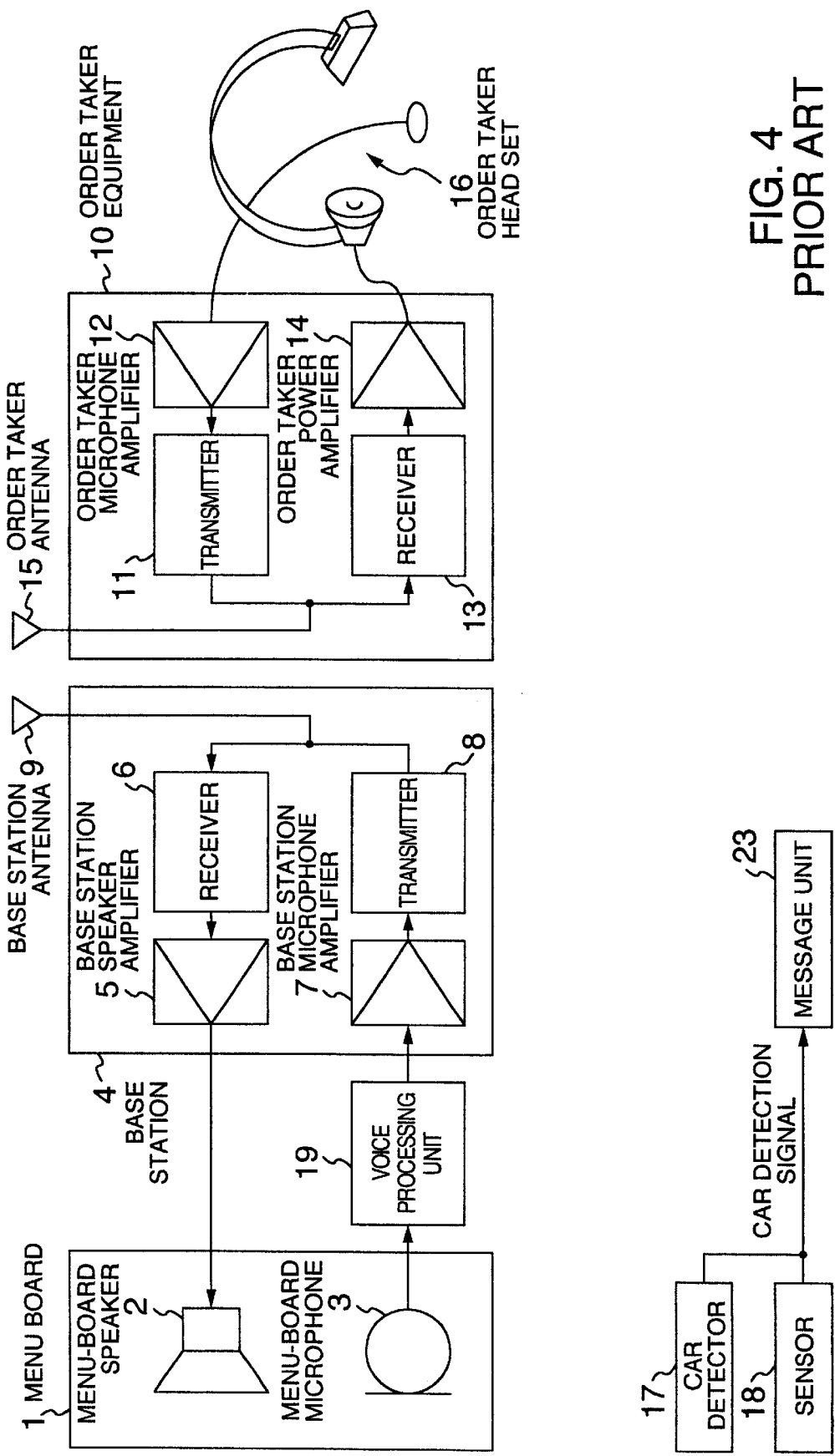
FIG. 4 is a block diagram showing generally and schematically a configuration of a conventional drive-through system.

Configurations of other blocks in the drive-through system according to the third embodiment shown in FIG. 3 are similar to those of the corresponding blocks in the drive-through system according to the first embodiment described above, so that the detailed description thereof will be omitted.

Next, description will be directed to operation of the drive-through system according to the third embodiment by reference to FIG. 3.

When a car enters a parking lane, a car detection signal is outputted from the car detector 317 or the sensor 318 to the control unit 321. Upon reception of the car detection signal, the control unit 321 outputs a processing start signal to the voice processing unit 319. Upon reception of the processing start signal, the voice processing unit 319 starts the processing. The contents of the processing are similar to those executed by the voice processing unit 119 of the drive-through system according to the first embodiment described above. The voice processing unit 319 outputs to the control unit 321 the gain control signal generated as the result of the processing. The control unit 321 controls the gains of the base station microphone amplifier 307 and the order taker power amplifier 314 in accordance with the gain control signal. In this manner, the gain of the voice signal inputted from the menu-board microphone 303 can be held at a substantially constant value.

Further, when the car detection signal is inputted from the car detector 317 or the sensor 318 to the control unit 321, the control unit 321 outputs the processing start signal to the image processing unit 320. Upon reception of the processing start signal, the image processing unit 320 processes the video signal from the camera 322 to thereby output to the control unit 321 the positional information signal indicating the position of the face, mouth or the like of the visitor. Then, the control unit 321 controls the position of the menu-board microphone 303 having directivity so that the menu-board microphone 303 is pointed toward the visitor's face or mouth. In this manner, the ratio of the visitor's voice signal to noise such as engine noise (i.e. S/N) can significantly be improved.

Operations of other blocks in the drive-through system according to the third embodiment shown in FIG. 3 are similar to those of the corresponding blocks in the drive-through system according to the first embodiment described above, so that the detailed description thereof will be omitted.

As can be appreciated from the foregoing description, in the drive-through system according to the third embodiment, the voice processing unit 319 can automatically be turned on and off in response to detection of the incoming car. Thereby, the voice processing can be started rapidly while the clerk can get rid of the burden of turning on/off the voice processing unit 319. Besides, the power consumption of the drive-through system can be reduced significantly. Furthermore, the visitor's voice level can be held substantially constant owing to the capability of controlling automatically the visitor's voice level, and the capability of orienting the pointing direction of the menu-board microphone 303 in accordance with the video signal from the camera 322. Thereby, the ratio of the visitor's voice signal to noise such as engine noise can be improved. As a result, the disturbance of the ambient noise can be mitigated remarkably, which allows the store clerk to perceive the visitor's voice with enhanced accuracy.

In the drive-through system according to the present invention, the voice processing unit can automatically start the voice processing in response to detection of the incoming car. Thereby, the voice level of the visitor can be held substantially constant, while the clerk can get rid of the burden of turning on/off the voice processing unit. Besides, the power consumption of the drive-through system can be reduced significantly. Additionally, the voice processing unit can be automatically turned on and off. Thereby, the possibility that the clerk forgets to turn on and off the voice processing unit can positively be excluded, so that the reliability of the drive-through system can be enhanced.

Many modifications and variations of the present invention are possible in the light of the above techniques. It is therefore to be understood that within the scope of the appended claims, the invention may be practiced otherwise than as specifically described.

What is claimed is:

1. A drive-through system, comprising:

car detecting means for automatically messaging entrance of an incoming car into a drive-through store;

a menu board including a speaker and a first microphone;

voice processing means for processing a voice signal generated through said first microphone of said menu board;

a base station operatively connected to said menu board for transmitting/receiving wirelessly the voice signal and a control signal;

an order taker head set including a second microphone and an earphone, and designed to be put on a head of a store clerk; and order taker equipment operatively connected to said order taker head set for transmitting/receiving wirelessly the voice signal and the control signal to/from said base station, wherein upon detection of the incoming car by means of said car detecting means, operation of said voice processing means is automatically started;

a control signal corresponding to a level of the processed voice signal inputted from said voice processing means is generated; and voice levels in said base station and said order taker equipment are automatically adjusted according to said control signal.

2. A drive-through system, comprising:

car detecting means for automatically messaging entrance of an incoming car into a drive-through store;

a menu board including a speaker and a first microphone whose pointing direction is controllable;

image pickup means for picking up an image of a visitor riding in said incoming car;

image processing means for processing an image signal outputted from said image pickup means;

a base station operatively connected to said menu board for transmitting/receiving wirelessly a voice signal and a control signal;

an order taker head set including a second microphone and an earphone, and designed to be put on a head of a store clerk; and order taker equipment operatively connected to said order taker head set for transmitting/receiving wirelessly the voice signal and the control signal to/from said base station, wherein the pointing direction of said first microphone is automatically adjusted so as to be oriented toward said visitor picked up by said image pickup means on the basis of the result of the processing executed by said image processing means.

3. A drive-through system, comprising:

car detecting means for automatically messaging entrance of an incoming car into a drive-through store;

a menu board including a speaker and a first microphone whose pointing direction is controllable;

voice processing means for processing a voice signal generated through said first microphone of said menu board;

image pickup means for picking up an image of a visitor riding in said incoming car;

image processing means for processing an image signal outputted from said image pickup means;

a base station operatively connected to said menu board for transmitting/receiving wirelessly said voice signal and a control signal;

an order taker head set including a second microphone and an earphone, and designed to be put on a head of a store clerk; and order taker equipment operatively connected to said order taker head set for transmitting/receiving wirelessly the voice signal and the control signal to/from said base station, wherein upon detection of the incoming car by means of said car detecting means, operation of said voice processing means is automatically started;

a control signal corresponding to a level of the processed voice signal outputted from said voice processing means is generated to thereby adjust automatically the level of the voice signal supplied from said menu board with said control signal in said base station and said order taker equipment; and the pointing direction of said first microphone is automatically adjusted so as to be oriented toward said visitor picked up by said image pickup means on the basis of the result of the processing executed by said image processing means upon detection of said incoming car.

4. A drive-through system, comprising:

car detecting means for messaging entrance of an incoming car into a drive-through store;

a menu board including a microphone;

voice processing means for processing a voice signal generated through said microphone;

a base station including first gain control means which controls gain of the voice signal processed by said voice processing means;

voice output means;

order taker equipment connected to said voice output means; and control means, wherein said base station further includes transmitting means which transmits to said order taker equipment the voice signal the gain of which is controlled by said first gain control means;

said order taker equipment includes receiving means which receives said voice signal transmitted from said transmitting means of said base station, and second gain control means which controls gain of said voice signal received by said receiving means to thereby output to said voice output means the voice signal the gain of which is controlled; and said control means, upon detection of the incoming car by said car detecting means, makes said voice processing means start operation to generate a control signal corresponding to a level of the voice signal from said microphone, whereby gain of said first gain control means of said base station and gain of said second gain control means of said order taker equipment are controlled in accordance with said control signal.

5. A drive-through system according to claim 4, wherein said voice output means is an earphone of a head set designed to be put on a head of a store clerk for use.

6. A drive-through system, comprising:

car detecting means for messaging entrance of an incoming car into a drive-through store;

a menu board including a microphone whose pointing direction is controllable;

image pickup means for picking up an image of a visitor riding in said incoming car;

image processing means for processing an image signal outputted from said image pickup means;

a base station operatively connected to said menu board;

voice output means;

order taker equipment operatively connected to said voice output means; and control means for orienting the pointing direction of said microphone toward the visitor picked up by said image pickup means on the basis of the result of the processing executed by said image processing means, wherein said base station includes transmitting means which transmits the voice signal generated through said microphone to said order taker equipment; and said order taker equipment includes receiving means which receives said voice signal transmitted from said transmitting means of said base station to thereby output said received voice signal to said voice output means.

7. A drive-through system according to claim 6, wherein said voice output means is an earphone of a head set designed to be put on a head of a store clerk for use.

8. A drive-through system, comprising:

car detecting means for messaging entrance of an incoming car into a drive-through store;

a menu board including a microphone whose pointing direction is controllable;

voice processing means for processing a voice signal generated through said microphone of said menu board;

image pickup means for picking up an image of a visitor riding in said incoming car;

image processing means for processing an image signal outputted from said image pickup means;

a base station including first gain control means for controlling gain of the voice signal processed by said voice processing means;

voice output means;

order taker equipment operatively connected to said voice output means; and control means for orienting the pointing direction of said microphone toward the visitor picked up by said image pickup means in accordance with the result of the processing executed by said image processing means, wherein said base station further includes transmitting means which transmits to said order taker equipment the voice signal the gain of which is controlled by said first gain control means;

said order taker equipment includes receiving means which receives said voice signal transmitted from said transmitting means of said base station, and second gain control means which controls gain of said voice signal received by said receiving means to thereby output to said voice output means the voice signal the gain of which is controlled; and said control means, upon detection of the incoming car by said car detecting means, makes said voice processing means start operation to generate a control signal corresponding to a level of the voice signal supplied from said microphone, whereby gain of said first gain control means of said base station and gain of said second gain control means of said order taker equipment are controlled in accordance with said control signal.

9. A drive-through system according to claim 8, wherein said voice output means is an earphone of a head set designed to be put on a head of a store clerk for use.

* * * * *